US 6,589,436 B1

(12) United States Patent
Tabib et al.

(10) Patent No.: US 6,589,436 B1
(45) Date of Patent: Jul. 8, 2003

(54) METHOD OF ADJUSTING THE FLATNESS OF A SLIDER USING SELECTIVE PLASMA ETCHING

(75) Inventors: Jila Tabib, San Jose, CA (US); Yiping Hsiao, San Jose, CA (US); Richard Hsiao, San Jose, CA (US); Richard T. Campbell, Campbell, CA (US); Ciaran A. Fox, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 09/593,990

(22) Filed: Jun. 14, 2000

(51) Int. Cl.$^7$ ............................................. G11B 17/32
(52) U.S. Cl. ..................... 216/52; 216/2; 216/22; 216/65; 216/52; 216/66; 216/67; 219/121.69; 219/121.73; 360/235.4; 360/318.1; 29/603.12
(58) Field of Search ....................... 216/22, 65, 52, 216/66–67, 121.69, 2; 219/121.69, 121.73; 360/235.4, 318.1; 29/603.12; 438/3

(56) References Cited

U.S. PATENT DOCUMENTS

| 4,301,353 A | 11/1981 | Suenaga et al. ............ 219/121 |
| 4,549,238 A | 10/1985 | Ertingshausen et al. .... 360/103 |
| 5,083,365 A | 1/1992 | Matsumoto .................. 29/603 |
| 5,136,445 A | 8/1992 | Zak ............................ 360/103 |
| 5,266,769 A | 11/1993 | Deshpande et al. .... 216/121.69 |
| 5,323,282 A | 6/1994 | Kanai et al. ................. 360/103 |
| 5,442,850 A | 8/1995 | Kerth .......................... 29/603 |
| 5,704,112 A | 1/1998 | Katase et al. ............. 29/609.12 |
| 6,051,099 A | * 4/2000 | Bus-Kwoffie et al. ...... 156/354 |

FOREIGN PATENT DOCUMENTS

| JP | 496326934 A | 12/1985 | ............ G11B/5/60 |
| JP | 405020826 A | 1/1993 | ............ G11B/21/21 |
| JP | 408315344 A | 11/1996 | ............ G11B/5/60 |
| JP | 409212837 A | 8/1997 | ............ G11B/5/60 |

* cited by examiner

Primary Examiner—Randy Gulakowski
Assistant Examiner—Gentle Winter
(74) Attorney, Agent, or Firm—Robert B. Martin; Bracewell & Patterson, L.L.P.

(57) ABSTRACT

Provided is a reactive ion etching (RIE) method for use in altering the flatness of a slider, whereby a slider or row of sliders is placed within a RIE apparatus. The apparatus comprises essentially an electrode within a chamber having an inlet and an outlet. The electrode is controlled by a bias power source. A source power is provided to the chamber to generate the plasma, wherein a gas or gas mixture is first introduced to the chamber and the source power is adjusted to maximize the plasma composition of ions and reactive neutral species. The ions and reactive neutral species are generated from reactive chemical species such as $CHF_3$ and other F-containing species. An inert gas such as Argon may also be present. Typically, TiC within the $Al_2O_3$ matrix of the slider substrate surface is etched at a faster rate than other substrate species.

14 Claims, 8 Drawing Sheets

METHOD OF ADJUSTING THE FLATNESS OF A SLIDER USING SELECTIVE PLASMA ETCHING

BACKGROUND OF THE INVENTION

1. Technical Field

The present invention relates in general to a method of adjusting the flatness, i.e., the crown and camber, of a slider using a selective plasma etching process. More particularly, the present invention is a method of selectively etching substrate chemical species from the surface of a slider, wherein selectively etching one species relative to another species on the slider surface will adjust the amount of crown and/or camber to the slider and hence, adjust the flatness of the slider.

2. Description of the Related Art

Magnetic head assemblies that "floats" or "flies" relatively to magnetic medium have been used extensively, and these assemblies are commonly referred to as magnetic head sliders. These assemblies provide a traducing relationship between a magnetic transducer and a magnetic recording medium, such as a rotating magnetic disk, so that a stable constant spacing can be maintained between the transducer and the disk. In magnetic recording technology it is continually desired to improve the aerial density at which information can be recorded and reliably read. This desire has lead to a trend toward greater bit density along the magnetic recording track and a shrinking track width. Another change that is usually required is a lower flying height, so it becomes more difficult to maintain the lower flying height constant to the degree required to reliably record and read data at the higher data rates.

The prior art process for making a magnetic head slider involves a lapping process in which the air-bearing surface (ABS) is defined and a subsequent process in which a pattern of rails is produced on the ABS. For example, U.S. Pat. No. 4,912,883 describes a lapping system in which the magnetic head assembly includes an inductive read/write head, and U.S. Pat. No. 4,914,868 describes a lapping system in which the magnetic head assembly includes a magneto-resistive write transducer. The pattern of rails can be produced by etching, ion milling, or other machine techniques, or by laser ablation as described in U.S. Pat. No. 4,301,353.

The prior art processes for making a magnetic head slider produce substantial stresses on the slider. The resulting distortion produces a concave surface on the lapped ABS surface which leads to negative crown and camber. Negative crown and camber can make it more difficult to meet the desired design requirements since the flying height is strongly affected by crown and camber. The prior art discloses several methods of correcting the flatness of a slider. U.S. Pat. No. 5,266,769 discloses a method of adjusting the flatness, i.e., the crown and/or camber, of a slider, wherein the lapped slider is exposed to a selective laser ablation process, whereby each slider is individually treated, typically on its flex side. On the flex side of sliders, laser ablation produces pits and grooves (1–10 micrometers deep) that allows for slider bowing towards ABS to create a positive crown. One drawback of the laser ablation method is that sliders are processed one at a time, which makes this method a low through-put process. Other similar methods can also be used such as micro-sandblasting.

What is needed is an improved method of adjusting the flatness of the slider which has a larger through-put and higher efficiency. The present invention is directed towards the use of selective reactive etching (otherwise known as reactive ion etching or RIE) to adjust the crown and camber of a slider.

SUMMARY OF THE INVENTION

It is therefore one object of the present invention to provide an improved method of altering the crown and camber (the "flatness") of a slider.

It is another object of the present invention to provide a batch method of altering the crown and camber of a slider, whereby a row of sliders can be processed simultaneously, thus allowing from 10,000 to 100,000 sliders to be processed in several minutes.

It is another object of the present invention to provide a method of altering the crown and camber of a slider that diminishes the possibility of contaminating the slider surface.

The foregoing objects are achieved by providing a reactive ion etching (RIE) method of altering the flatness of a slider, whereby a slider or row of sliders is placed within a RIE apparatus. The apparatus comprises essentially an electrode within a chamber having an inlet and an outlet. The electrode is controlled by a bias power source. A source power is provided to the chamber to generate the plasma, wherein a gas or gas mixture is first introduced into the chamber and the source power is adjusted to maximize the plasma composition of ions and reactive neutral species. The ions and reactive neutral species are generated from reactive chemical species such as $CHF_3$ and other F-containing species. An inert gas such as Argon may also be present as a mixture with the reactive chemical species.

The bias power is adjusted to control the bombardment energy of the ions in the plasma, while the reactive neutral species react selectively with substrate species, thus leaving pits and craters in the exposed slider surface. These pits and craters thus effectuate a change in the crown and camber of the slider. Preferably, a positive crown and camber is generated in the slider(s). Also preferably, the flex-side of the slider is the exposed side of the slider. Further, in one preferred embodiment, the slider is made from $Al_2O_3$ and TiC, the TiC being selectively etched relative to the $Al_2O_3$ material, thus effectuating the adjustment of the slider flatness.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The present invention is a method of altering the flatness, i.e. the crown and camber, of a slider using an RIE process, whereby the slider, after being lapped, is exposed to a plasma of halogen-containing chemicals. Such a plasma will selectively etch away certain substrate components such as, e.g., TiC, to a greater extent than, e.g., $Al_2O_3$. This etching leaves craters and pits in the exposed surface of the slider and removes stresses within the slider matrix, thus effectuating a change in the crown and/or camber. The present invention can be used to adjust the flatness of a slider, and in particular, can be used to adjust the presence and amount of crown and/or camber in the slider. Thus, when referring to "a method of alternating the flatness of the slider", it is meant that any combination of altering the crown of the slider, altering the camber to the slider, or altering a combination of the two can be performed.

Figure 1A:
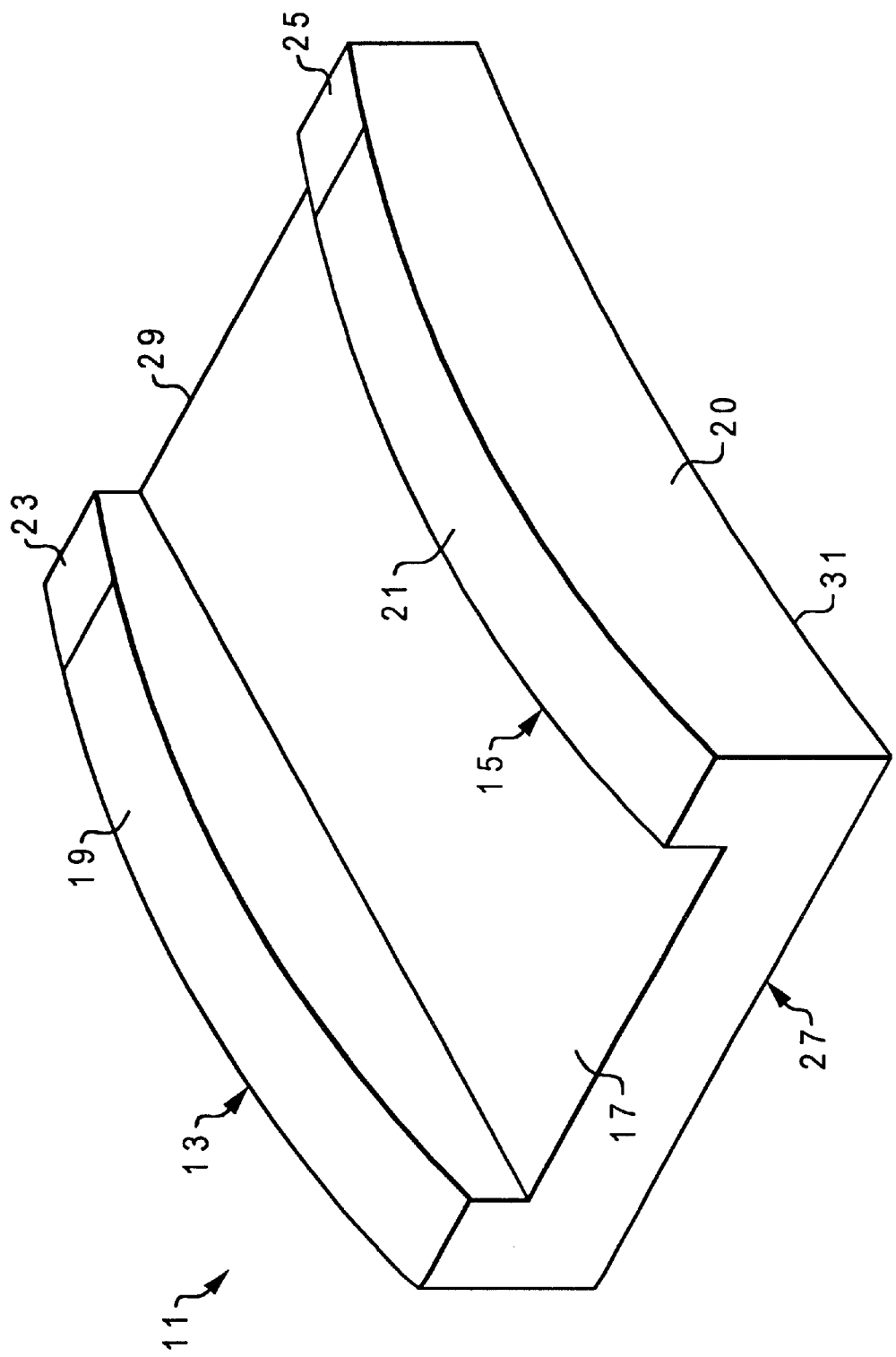
FIG. 1A is a perspective view of a slider.
Figure 1B:
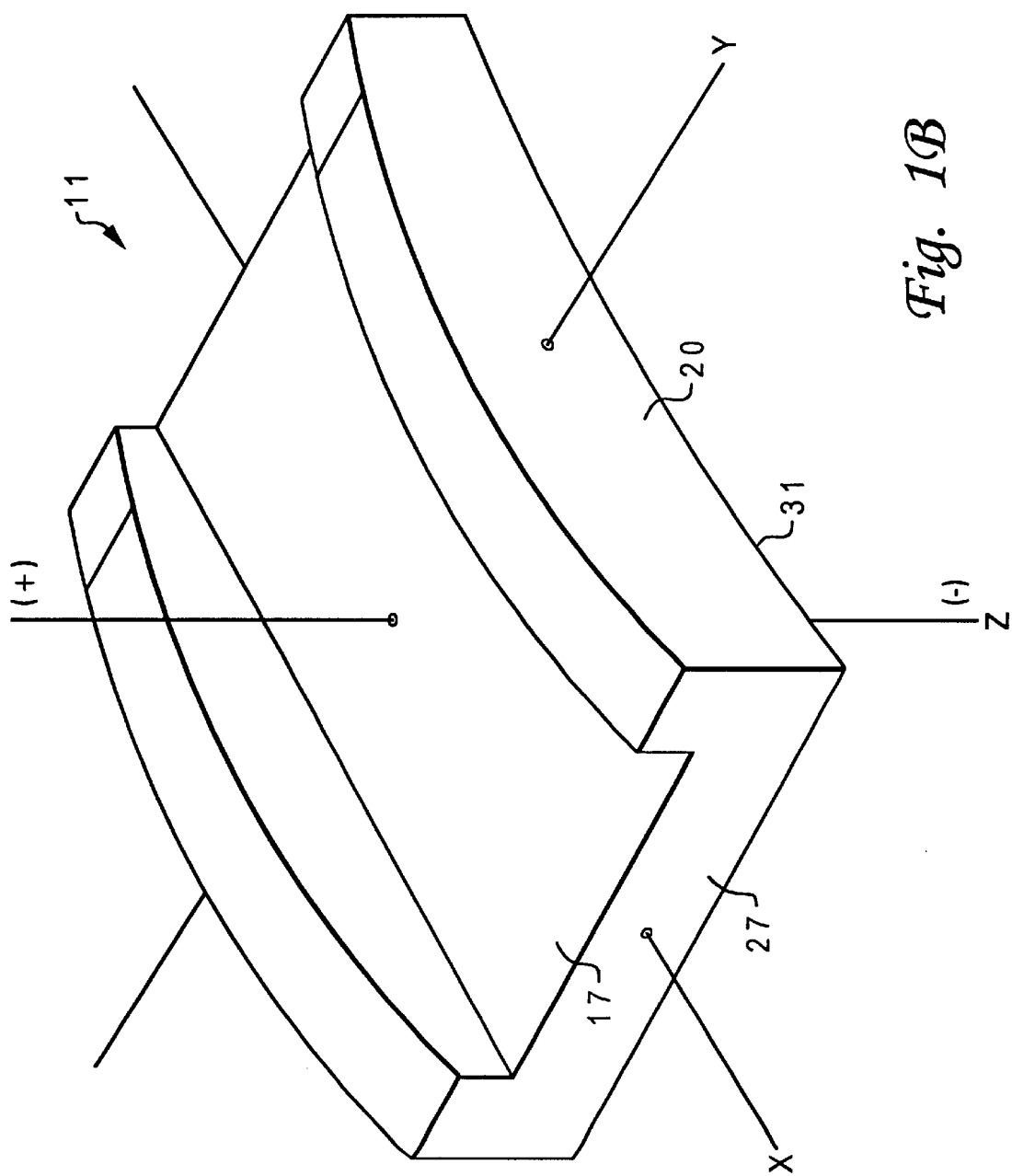
FIG. 1B is a perspective view of the slider in FIG. 1A, wherein a three-dimensional grid is placed on the slider for representative purposes.

The method of the present invention will now be described with reference to the Figures. In particular, FIG. 1A shows one embodiment of a slider having a positive crown (crown will be defined below). FIGS. 1A and 1B refer to the same slider 11. Slider 11 includes rails 13 and 15, each rail having a face, only one face 20 being shown. Each of rails 13 and 15 incorporate surfaces 19 and 21, respectively. Rails 13 and 15, each having tapers 23 and 25, are located towards the leading edge 29. Surfaces 19 and 21 are adjacent to recessed area 17. Opposite the leading edge 29 is trailing edge 27. Recessed area 17 and surfaces 19 and 21 all make up the air-bearing surface (ABS). Opposite the ABS is the flex-side 31 of the slider. The slider is typically part of a wafer, which is a matrix of sliders arranged in rows. When fully processed, the rows are cut into the sliders such as in FIG. 1.

On the trailing edge 27 is typically located a head. The head is typically formed in a thin layer of alumina deposited on the trailing surface of the slider, and is a magnetoresistive read element and inductive head for writing data. Electrical terminal pads provide electrical connection for the magnetic head. A variety of other ABS and head designs are known in the art, such as disclosed in U.S. Pat. No. 5,650,893 (for negative pressure design) and U.S. Pat. No. 4,894,740 (for positive pressure design), the disclosures of which are incorporated herein by reference.

In the typical operation of a slider over or under a moving disk, the ABS made up of surfaces 19 and 21 and recessed face 17 face the rotating disk, while the flex side 31 typically faces away from the disk. The design of the slider can be such as to sustain a positive air pressure between the ABS and the disk, or sustain a negative air pressure between the ABS and the disk. The slider, which constitutes the bulk of the thin film head slider, is made of a ceramic material such as $Al_2O_3$-TiC (referred to as N58), or other suitable material.

Figure 2A:
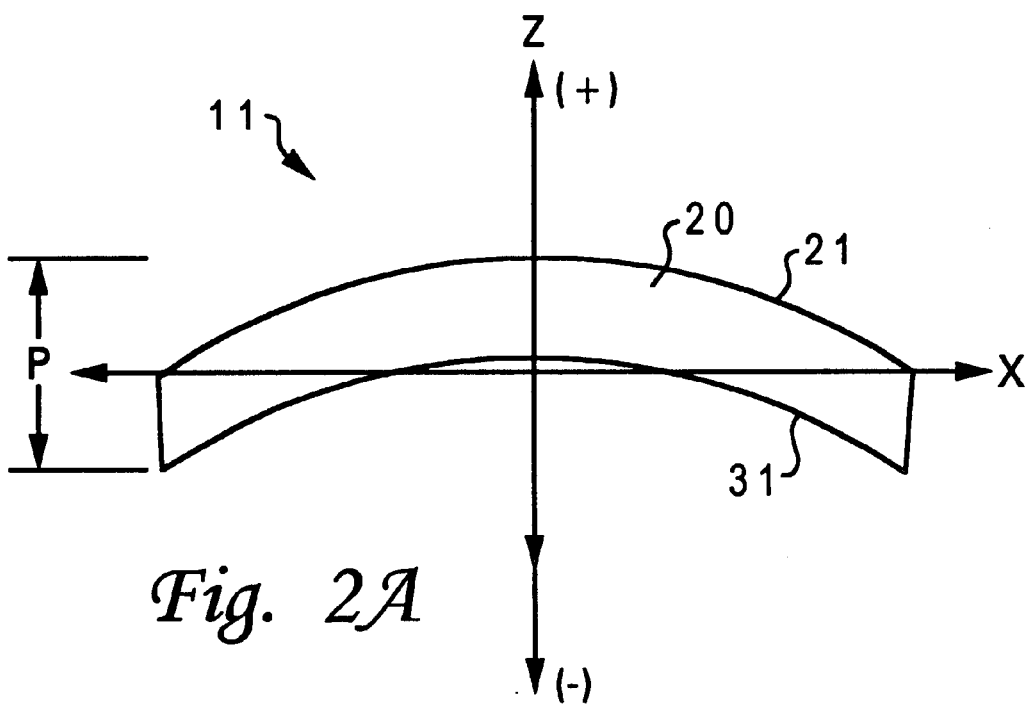
FIG. 2A is a side view of the slider in FIG. 1A showing positive crown.
Figure 2B:
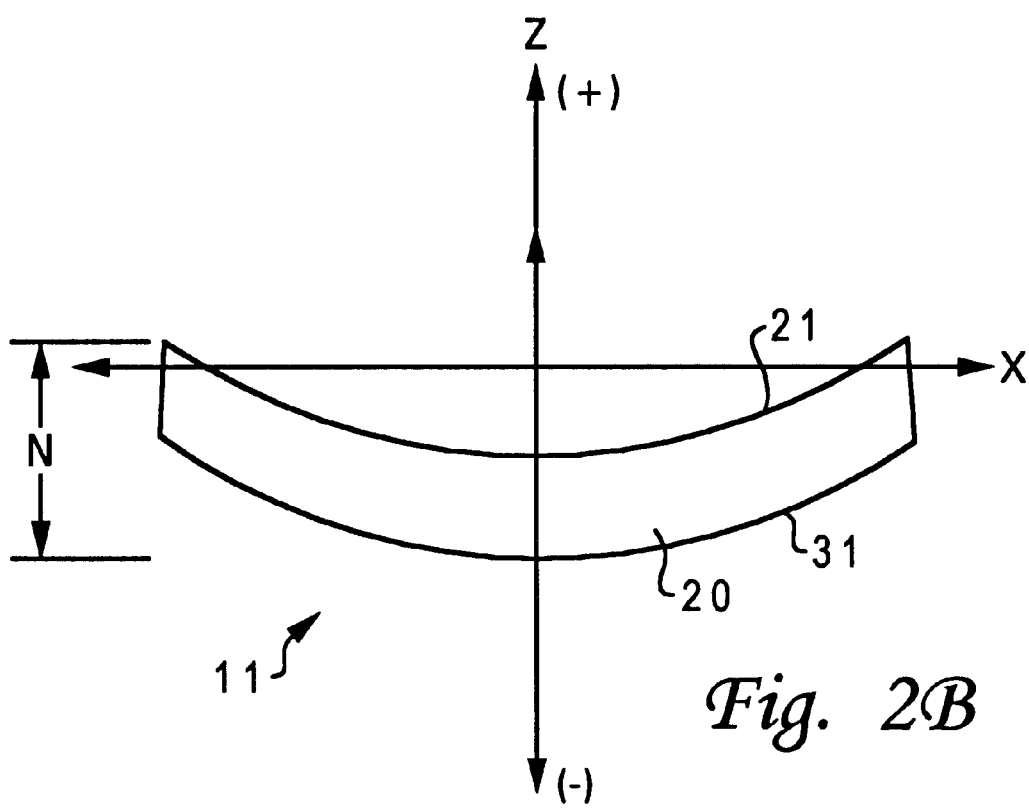
FIG. 2B is a side view of the slider in FIG. 1A showing negative crown.

The presence of camber and crown in a slider is further described in FIG. 1B, and in FIGS. 2A and 2B. FIG. 1B shows the slider 11 as placed within a three-dimensional set of axes. The degree of "flatness" in the slider can be described with reference to the crown and camber of the slider within the various planes, e.g., the XY-, YZ-, or XZ-planes. Any bend above or below the plane defined by the x-axis and z-axis (XZ-plane) is crown as illustrated in FIG. 1B and in FIGS. 2A and 2B. For instance, in the embodiment of slider 11 shown in FIG. 1B and FIG. 2A, when looking into face 20, there is shown a crown in the slider, the slider being bent within the XY-plane, in this case a positive crown due to the curve being in the positive (+) direction as indicated in FIG. 1B. Camber is described by looking directly into the YZ-plane of slider 11. For instance, when looking in the direction of the trailing edge 27, any bend above or below the YZ-plane is defined as camber, either positive (+) or negative (–). A combination of bends either within the XZ-plane or YZ-plane is defined as twist.

FIGS. 2A and 2B further illustrate the nature of the presence of crown in a slider. In both FIGS. 2A and 2B the perspective is towards the face 20, or the XZ-plane of slider 11. FIG. 2A shows positive crown, wherein there is a shift above the XY-plane (+). The slider having positive crown is characterized by having a concave flex-side 31. Positive crown is represented by P in FIG. 2A. FIG. 2B shows an example of negative crown characterized by the flex-side 31 being convex. In negative crown there is a bend below the XY-plane along the z-axis in the negative (–) direction (see also FIG. 1B). The amount of bending is defined by N. When manufacturing sliders, it is often preferable to have positive crown and camber. On the other hand, it is often desirable to eliminate any twist in the slider, as twist reduces the efficiency of the read-write capabilities of the magnetic head of the slider.

The flatness of a slider can be altered or adjusted by RIE, wherein ions and neutral species generated in a plasma in which the slider is exposed will selectively react with and etch away certain slider components relative to other components. RIE utilizes the synergistic effect of ion bombarding and chemical reaction in a plasma. In a conventional-plate reactive ion etcher, a row of sliders (hereinafter referred to as a row) is placed on an electrode which is powered by a radio-frequency (RF) generator or bias-power. The bias-power is coupled into the chamber with reactive chemical species and inert gas if present to generate a plasma of a reactive ions and neutral radical species that are highly reactive. The bias power can be adjusted independently, and the voltage is typically adjusted such that the electrode is negatively charged.

The plasma is generated and its intensity controlled by the source power, which is typically an RF coil on top of a dielectric window that generates a plasma within the chamber. The reactive ions, positively or negatively charged ions, and the neutral species in the plasma can react with the wafer or slider row material to effectuate the etching process. Since electrons are more mobile than positive ions in the plasma, a negative DC voltage is preferably developed on the electrode where power is introduced. Since the wafer is placed on this electrode, the wafer experiences the bombardment from ions accelerated to the electrode. Adjusting the bias power effects the bombardment energy of the ions within the plasma against the row or slider. The ion bombardment causes physical damage on the wafer material and facilitates the desorption of the chemical reaction product, the chemical reaction product being a volatile compound that can be removed from the slider. As a result, chemical etching in a RIE process is dramatically accelerated. Since etching products are volatile and therefore pumped away, usually no redeposition is formed during RIE. Furthermore, because of the differing responses of different materials to chemical species in the plasma, a high etching selectivity can be achieved.

The most commonly used high-density plasma ion etchers are electron-cyclotron-resonance (ECR) etchers and inductive-coupled-plasma (ICP) etchers. The ICP method is the preferred method of the present invention, although ECR and other plasma etchers can be used. In these etchers, the row or slider is still placed on an electrode which is powered by an RF source. However, the plasma is generated by a second power source via a more efficient mode and the power is launched through a dielectric window into the chamber. For plasma generation, an ECR reactor uses a microwave source and a wave guide network and an ICP reactor uses an RF source and a coil to accomplish inductive coupling. The plasma density in a high density plasma reactor is typically two orders of magnitude greater than in a conventional RIE. Furthermore, the plasma density and ion bombardment energy are decoupled, with ion bombardment energy controlled by the RF power applied to the cathode and the plasma density controlled by the source (ECR or ICP) power. This decoupling offers greater latitude for etching process development in the present invention. The etching in the high-density plasma reactor is usually accomplished at a lower pressure than a typical RIE. A lower pressure improves the etching anisotropy by reducing ion scattering while the high density of the plasma enables the etching to proceed at an acceptable rate.

Figure 3A:
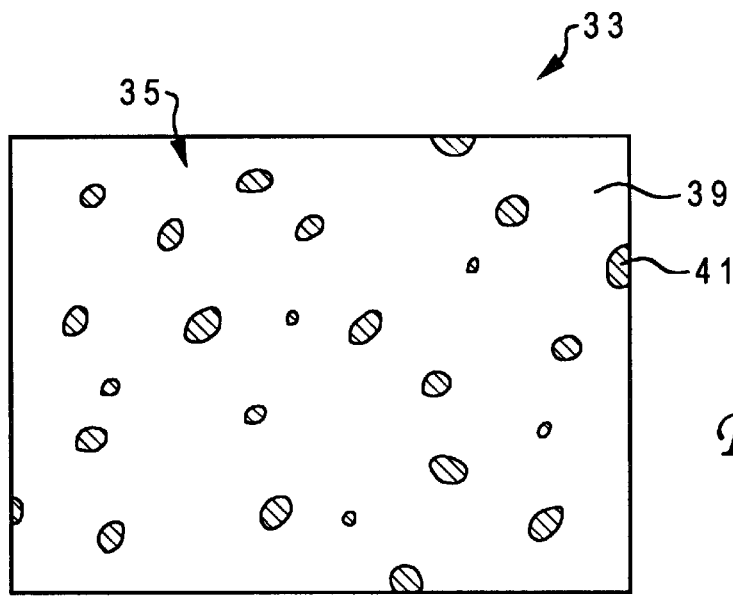
FIG. 3A is an illustration (not to scale) of the top of a slider wherein the various substrate chemical species that make up the slider are distinguished.
Figure 3B:
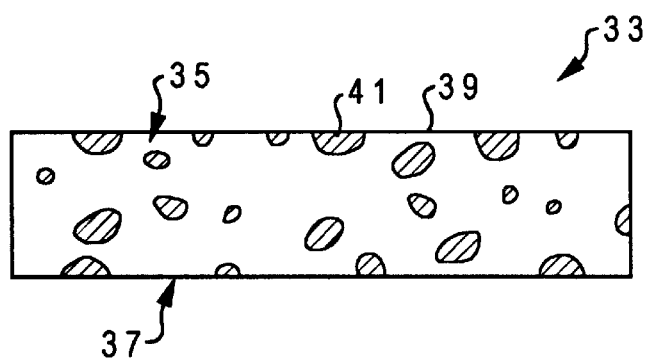
FIG. 3B is a side view of the slider in FIG. 3A.

The process of the present invention, altering the flatness of a slider by RIE, is further described with references to FIGS. 3A, 3B, and FIGS. 4A through 4C. Specifically, FIGS. 3A and 3B show a top and side view, respectively, of a slider 33, wherein the views show a stylized representation of the various substrate chemical species within the slider 33. The drawing is by no means meant to be to scale, only representative of the invention. Typically, there are at least two different substrate chemical species within a slider, but there may be more. In slider 33, there are two substrate chemical species represented: species 39 and 41. Species 39 in a typical embodiment of a slider is aluminum oxide($Al_2O_3$). Substrate chemical species 41 in the present embodiment is titanium carbide (TiC). The embodiment of slider 33 shown in FIGS. 3A and 3B is by no means meant to be limiting of the identity and number of substrate chemical species in a slider. In FIG. 3A, is shown a view down on to the flex side of the slider. FIG. 3B shows a side view of the slider wherein the flex side 35 is facing up and the air-bearing surface 37 is facing down.

On slider 33 there are regions where substrate chemical species 41 is located on the surface of the flex side 35 of the slider. Thus, some of these regions are exposed to the external environment, and thus can be treated by RIE. In RIE processes, the plasma generated within the chamber will react with a substrate chemical species, preferably, one substrate chemical species more than another. In the present embodiment, a plasma will typically react to a greater extent with substrate chemical species 41, that species being TiC, to a greater extent than with substrate chemical species 39, that species being $Al_2O_3$.

Figure 4A:
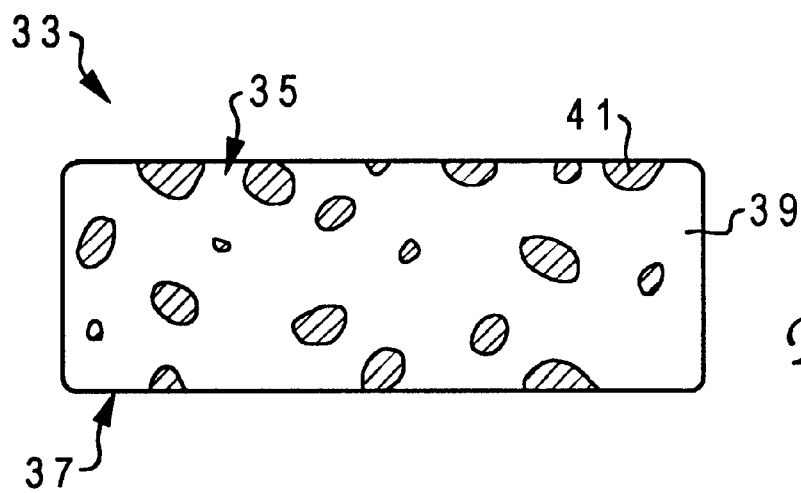
FIGS. 4A through 4C illustrate the RIE process of the invention on a slider.
Figure 4B:
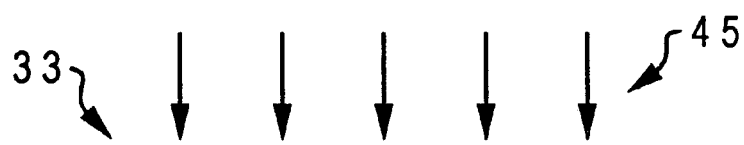
Figure 4B:
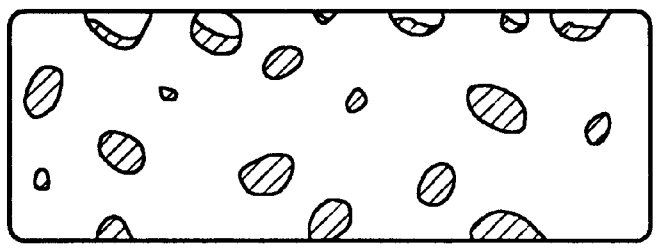
Figure 4C:
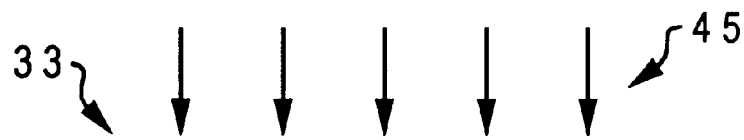
Figure 4C:
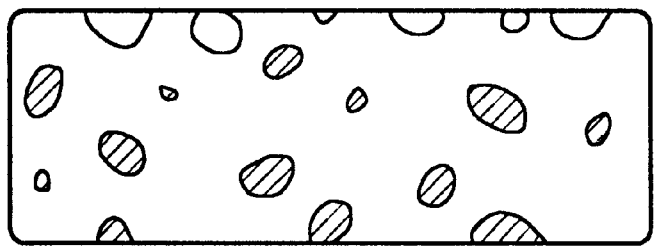

FIGS. 4A through 4C show one embodiment of the RIE process on a slider surface. First, the process of forming the slider ABS surface has been performed. Typically, the wafer is cut into four quadrants and each quadrant is lapped to obtain the desired throat and element heights. The desired throat heights and head element heights are achieved by the provision of lapping guides. The lapping guides are then used as indicators of element height during the lapping process for the slider unit. The final height of the element may be determined by measuring the resistance of the element itself. See, for example, U.S. Pat. Nos. 4,914,868 and 4,912,883, the disclosure of which are incorporated by reference for all purposes.

After lapping, each row is removed from the holder and bonded to a carrier for further processing of the slider to form the ABS pattern on the top side of the slider. The ABS pattern is etched in each slider using art known as lithographic etching techniques. The step of producing a chosen ABS pattern on the slider can be carried out by the RIE, ion milling, or other machining techniques, or by laser ablation such as described in U.S. Pat. No. 4,301,353.

Next, with patterning resist still in place, the rows of sliders on the wafer are debound and then placed on an electrode within the RIE apparatus chamber. The slider or rows are placed onto the electrodes such that the ABS faces downward against the electrode (or stage) and the flex side of the slider faces upwards. The rows or slider within the RIE chamber are then subjected to the process of the invention. In one embodiment, a patterning resist may be desirable. In that case, with the patterning resist still in place, the elements of the ABS are protected from plasma attack when placed in the plasma.

Figure 5:
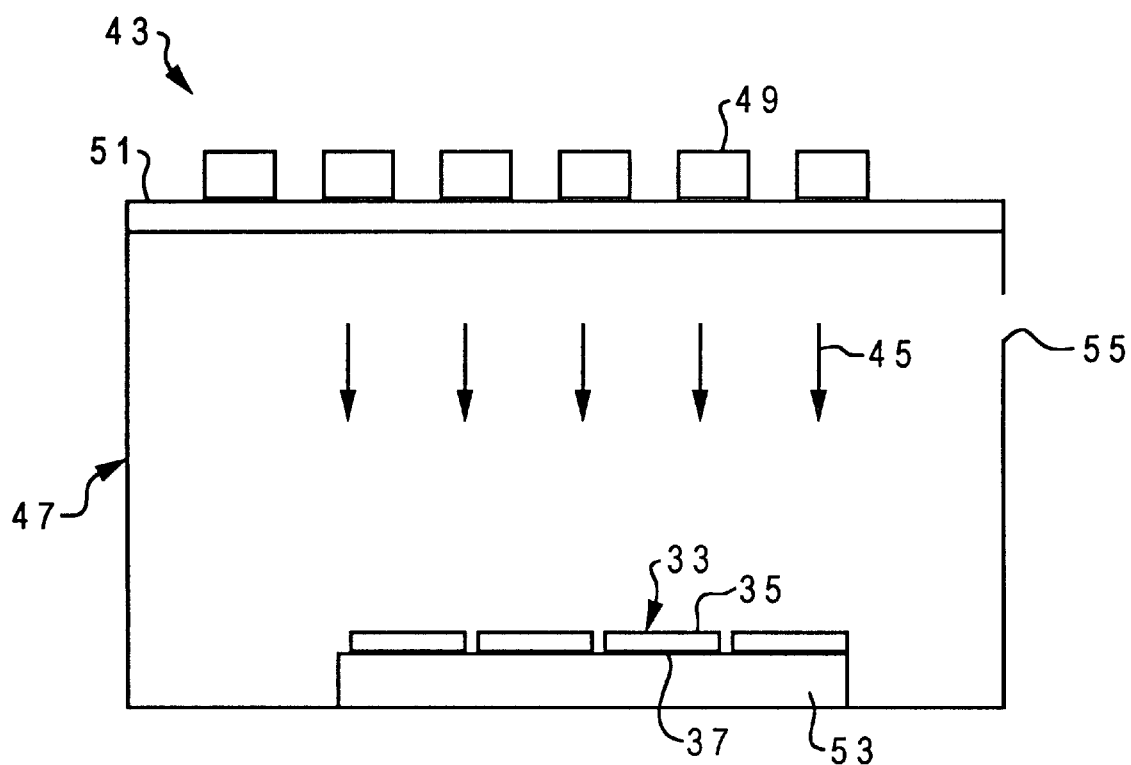
FIG. 5 shows a cutaway view of an apparatus that carries out the reactive ion etching process of the invention.

A generalized, cutaway view of one embodiment of the apparatus used to perform reactive ion etching (RIE) is shown in FIG. 5. The apparatus 43 includes chamber 47, electrode/stage 53 is used to support the row of sliders 33. The electrode 53 is typically negatively charged, thus drawing or accelerating positively charged ions towards it, and hence, the slider rows 33. Each slider has an ABS side 37 and flex-side 35. Typically, the flex-side 35 is facing upwards away from the electrode 53, thus exposed to the impinging ions and neutral reactive species of plasma 45. The source power 49 supplies the ionizing power for generating the plasma 45 within the chamber 47. The source 49 is typically located behind a dielectric window 51, thus physically removing the source from the plasma while allowing plasma generation within the chamber to occur. Gas, typically Ar mixed with some other reactive chemical species, is used to produce reactive ions or neutral species within the plasma for selectively reacting with the rows of sliders 33.

A plasma is generated in the chamber as described above. More particularly, the plasma may be generated from a mixture of Argon (Ar) and some other reactive chemical species, or the chemical species may be alone. An example of a reactive chemical species is $CHF_3$, $CF_4$, and/or $SF_6$. Other compounds having the fluorine or other halogen functional groups (Cl, Br, etc.) may also be used as a reactive chemical species in generating the reactive ions within the plasma. A plasma of, for example, $SF_6$, would typically contain neutral reactive species of $SF_5$., $SF_4$., F., and ions of F and $SF_x$. Argon or other inert gases are transformed into positive ions as well, and are accelerated towards the slider rows 33 by the electrode 53. Other inert gases such as noble gases may be used in the method of the invention.

The plasma, having some directionality, as in ion milling, is described by arrows 45 in FIGS. 4B and 4C.

The plasma impinges upon flex-side 35 of slider 33, selectively reacting with substrate chemical species 41, in the present embodiment TiC. Although substrate chemical species 39, in the present embodiment $Al_2O_3$, reacts slightly with plasma 45, species reacts to a greater extent as shown in the data to follow. The reaction between the plasma and the TiC produces a volatile compound that can be removed from the slider surface. The removal of the TiC leaves small craters in the slider surface that then alters the flatness of the slider. The production of a volatile compound is advantageous in that the volatile compound can be pumped away using a vacuum pump or some other means, therefore precluding the possibility of redeposition onto the flex side or any other surface of the slider.

Within the RIE chamber there are various ways of altering the rate and amount of removal of substrate chemical species 41. Either the plasma density (derived from the source power) or the bombardment energy (derived from the bias power) can be controlled independently from one another to change the rate of reaction. The source power is typically between about 100 watts and 600 watts, and preferably between about 300 and 500 watts. Further, the amount of time that the slider surface is exposed to plasma 45 will also alter the amount of etching. Finally, the identity and amount of reactive chemical species such as $SF_6$ or $CF_4$ can be varied, as well as the pressure within the chamber.

Figure 6A:
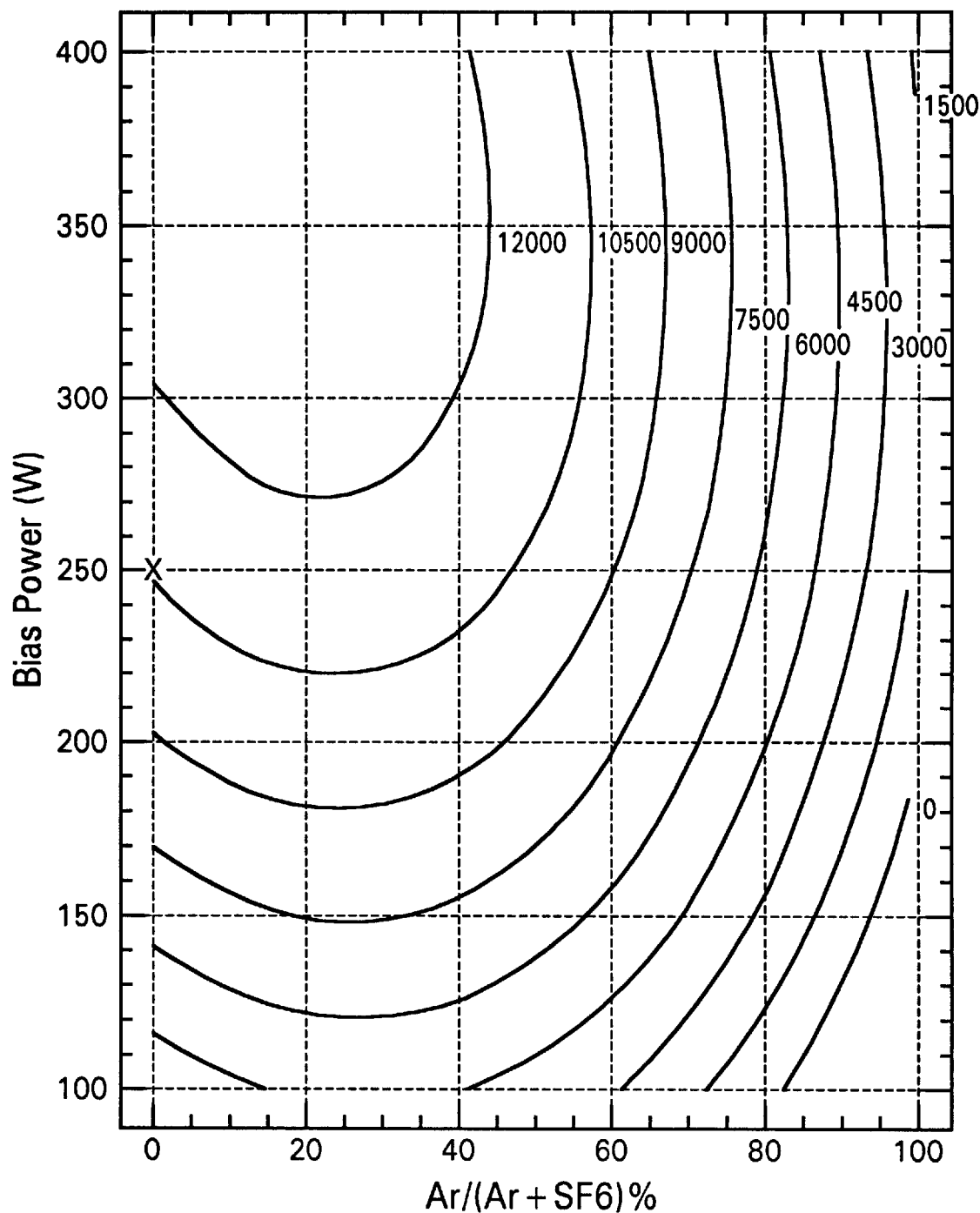
FIG. 6A is a graphical representation of reactive ion etching data of $Ar/(Ar+SF_6)\%$ as a function of bias power of the electrode, wherein the curves represent rates of TiC etching.
Figure 6B:
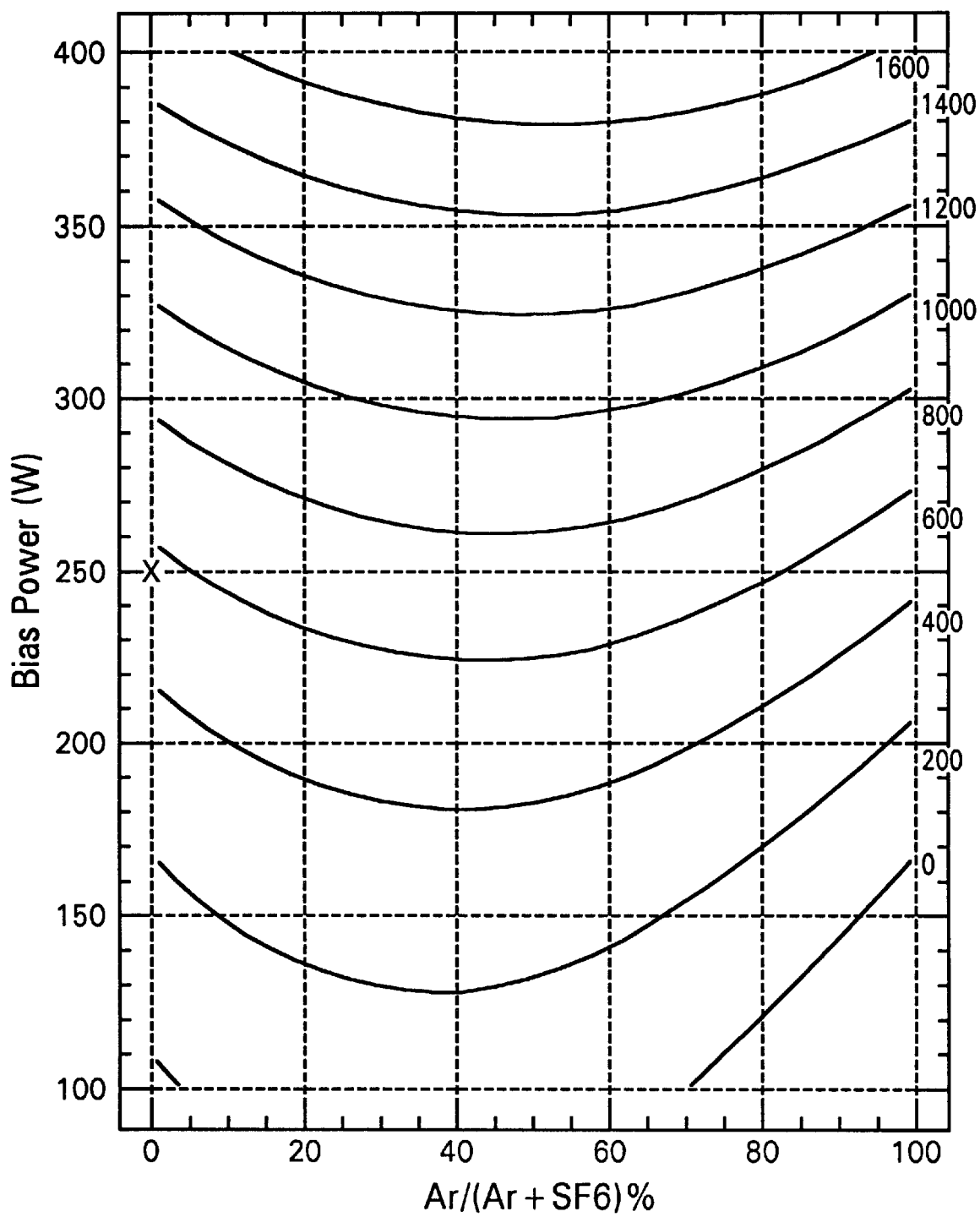
FIG. 6B is a graphical representation of reactive ion etching data of $Ar/(Ar+SF_6)\%$ as a function of bias power of the electrode, wherein the curves represent rates of $Al_2O_3$ etching.

The method of RIE of the present invention is used to selectively etch away one substrate chemical species relative to another chemical species within the slider. Suitably, one substrate chemical species is etched away from the slider at a rate of about 3 times or greater the ratio of removal of another chemical, preferably about 5 times or greater; more preferably about 10 times or greater. FIGS. 6A and 6B show data that results from the method of the present invention, wherein a slider made from a mixture of $Al_2O_3$ and TiC was etched. Specifically, FIG. 6A shows that at increasing power (W), and increasing amounts of $SF_6$ in the Ar plasma, the etch rate for TiC increases to as high as 12,000 Å/min at about 300–350 W of bias power. At the same power (and ratio of Ar to $SF_6$), the etch rate for $Al_2O_3$ is only about 1,000 to 1,200Å/min as shown in FIG. 6B. These data demonstrate that for one embodiment of a slider containing $Al_2O_3$ and TiC, a differential etch rate can be achieved. This, in turn, will effectuate a change in the flatness of the slider exposed to the reactive ion etching.

Figure 7:
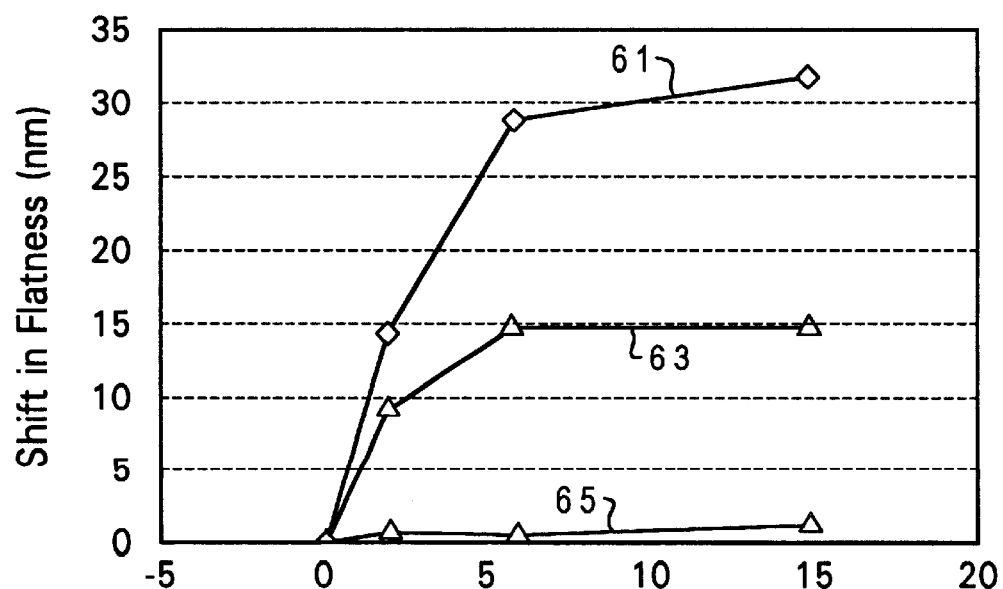
FIG. 7 is a graphical representation of reactive ion etching data showing the amount of crown, camber, and twist in a slider exposed for, a length of time to the reactive ion etching process.

Adjusting the crown and/or camber of a slider by the method of the present invention is shown in FIG. 7. The y-axis in the plot represents the degree to which camber or crown is changed by the method of the invention. At time zero, there is some crown and camber, either positive or negative, in the slider exposed to RIE. As time progresses, a rise in the curve (increase in "shift in flatness") indicates a greater positive crown and camber. The data in curve 61 show the change of crown in the flatness of a slider exposed to the reactive ion etching process as a function of plasma exposure. As shown in the data, the flatness of the slider can be greatly effected by changing the crown. Curve 63 shows a change in the camber of a slider as a function of plasma exposure time. Finally, the amount of twist in curve 65 is essentially not effected, indicating that the method of the invention will not cause detrimental twist. These data represent only one embodiment, however, and the change in the flatness of a slider may vary depending upon the composition of the slider and the initial flatness of the slider.

The present invention offers several advantages over the prior art. One advantage is that the present method can be applied to a batch process of slider rows, whereas the prior art methods could only be carried out on individual sliders. Thus, by the present method, 10,000 to 100,000 sliders can be processed in only minutes.

Another advantage to the present invention is that the plasma, once it reacts with the surface species of the slider, generates volatile species that can be easily pumped or otherwise drawn from the chamber, thus eliminating the possibility of contamination of the slider or row of sliders.

Yet another advantage to the present invention is that TiC, a typical substrate species of sliders, is rapidly removed relative to other methods such as ion milling. For example, ion milling alone removes only about 300 Å/min of TiC, whereas RIE of the present invention removes at least 10,000 Å/min TiC.

While the invention has been particularly shown and described with reference to a preferred embodiment, it will be understood by those skilled in the art that various changes in form and detail may be made therein without departing from the spirit and scope of the invention.

What is claimed is:

1. A method of altering the flatness of a slider by reactive ion etching, the slider having a flex side and having an opposite, air bearing surface, the method comprising:

lapping a plurality of sliders, each slider comprising at least a first substrate chemical and a second substrate chemical;

placing the plurality of sliders within a RIE chamber such that each slider flex side to be etched is exposed, thereby presenting an exposed slider flex surface;

subjecting the plurality of sliders to a widespread selective etch technique by generating a plasma within the chamber, wherein the plasma causes the removal of the first substrate chemical to a greater extent than the removal of the second substrate chemical, thereby eliminating a need for individual slider marking.

2. The method of claim 1, wherein the sliders are placed on an electrode which is powered by a bias power, the electrode effectuating the acceleration of ions within the plasma towards the exposed slider flex surfaces once the electrode is charged.

3. The method of claim 1, wherein a source power controls the formation of the plasma, the source power being between about 100 and 600 watts.

4. The method of claim 1, wherein a source power controls the formation of the plasma, the source power being between about 300 and 500 watts.

5. The method of claim 1, wherein the plasma is generated from a reactive chemical species.

6. The method of claim 5, wherein the plasma is generated from reactive chemical species such as a fluorine compound.

7. The method of claim 6, wherein the fluorine compound is selected from a group comprising $CHF_3$, $CF_4$, and SF6.

8. The method of claim 5, wherein an inert gas is present in a mixture with the reactive chemical species.

9. The method of claim 8, wherein the inert gas is Argon.

10. The method of claim 2, wherein a source power is used to generate the plasma, the source power being controlled independently of the bias power.

11. The method of claim 1, wherein the pressure within the reaction chamber can be regulated.

12. The method of claim 1, wherein the first substrate chemical is TiC.

13. The method of claim 1, wherein the second substrate chemical is $Al_2O_3$.

14. The method of claim 1, wherein the first substrate chemical is removed at a rate of about 5 times or greater than the rate of removal of the second chemical.

* * * * *